(12) United States Patent
Rensing et al.

(10) Patent No.: US 10,605,647 B2
(45) Date of Patent: Mar. 31, 2020

(54) VIBRATORY FLOWMETER TEST TONES WITHOUT RAMP TIME

(71) Applicant: Micro Motion, Inc., Boulder, CO (US)

(72) Inventors: Matthew Joseph Rensing, Cincinnati, OH (US); Christopher George Larsen, Cincinnati, OH (US); Timothy J. Cunningham, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 68 days.

(21) Appl. No.: 15/746,669

(22) PCT Filed: Jul. 27, 2015

(86) PCT No.: PCT/US2015/042240
§ 371 (c)(1),
(2) Date: Jan. 22, 2018

(87) PCT Pub. No.: WO2017/019012
PCT Pub. Date: Feb. 2, 2017

(65) Prior Publication Data
US 2018/0216987 A1 Aug. 2, 2018

(51) Int. Cl.
*G01F 25/00* (2006.01)
*G01F 1/84* (2006.01)

(52) U.S. Cl.
CPC ........ *G01F 25/0007* (2013.01); *G01F 1/8436* (2013.01)

(58) Field of Classification Search
CPC ............................ G01F 25/0007; G01F 1/8436
USPC .......................................................... 73/1.34
See application file for complete search history.

(56) References Cited

U.S. PATENT DOCUMENTS

2008/0223148 A1* 9/2008 Cunningham ........ G01F 1/8413
73/861.356

FOREIGN PATENT DOCUMENTS

WO      2007040468 A1     4/2007

OTHER PUBLICATIONS

Rensing, Matthew and Cunningham, Timothy. "Coriolis Flowmeter Verification via Embedded Modal Analysis". (Year: 2011).*

(Continued)

*Primary Examiner* — Tarun Sinha
(74) *Attorney, Agent, or Firm* — The Ollila Law Group LLC (57) ABSTRACT

A meter verification method for a vibratory flowmeter (5) is provided, comprising vibrating a sensor assembly (10) of the vibratory flowmeter (5) with a plurality of test tones in a vibration mode using a driver (180), wherein the plurality of test tones is applied substantially instantly, in the absence of a ramp function. A driver (180) current is determined, and response voltage of pickoff sensors (170L, 170R) are determined for the vibration mode. The instantaneous frequency of the pickoff sensor (170L, 170R) signals is measured, and a filter is applied to isolate the response at each of the plurality of test tones. The filter is also applied to the instantaneous frequency measurements. The same delay is applied to the frequency measurements and the response at each of the test tones. A meter stiffness value (216) is generated using the current (230) and the response voltage (231), and proper operation of the vibratory flowmeter (5) is verified using the meter stiffness value (216).

13 Claims, 7 Drawing Sheets

(56) References Cited

OTHER PUBLICATIONS

Matthew Rensing, et al, Coriolis Flowmeter Verification Via Embedded Modal Analysis, IMEMS and Nanotechnology, vol. 4, Jan. 1, 2011, pp. 851-860, Springer New York, New York, NY.

* cited by examiner

VIBRATORY FLOWMETER TEST TONES WITHOUT RAMP TIME

TECHNICAL FIELD

The present invention relates to a vibratory flowmeter and method, and more particularly, to an improved vibratory flowmeter and method for meter verification.

BACKGROUND OF THE INVENTION

Vibrating conduit sensors, such as Coriolis mass flowmeters and vibrating densitometers, typically operate by detecting motion of a vibrating conduit that contains a flowing material. Properties associated with the material in the conduit, such as mass flow, density and the like, can be determined by processing the measurement signals received from the motion transducers associated with the conduit. The vibration modes of the vibrating material-filled system generally are affected by the combined mass, stiffness, and damping characteristics of the containing conduit and the material contained therein.

A typical Coriolis mass flowmeter includes one or more conduits, or flow tubes, that are connected inline in a pipeline or other transport system and convey material, e.g., fluids, slurries, emulsions, and the like, in the system. Each conduit may be viewed as having a set of natural vibration modes, including for example, simple bending, torsional, radial, and coupled modes. In a typical Coriolis mass flow measurement application, a conduit is excited in a vibration mode as a material flows through the conduit, and motion of the conduit is measured at points spaced along the conduit. Excitation is typically provided by an actuator, e.g., an electromechanical device, such as a voice coil-type driver, that perturb the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at both positions upstream and downstream of the actuator. The two pickoff sensors are connected to electronic instrumentation. The instrumentation receives signals from the two pickoff sensors and processes the signals in order to derive a mass flow rate measurement or a density measurement, among other things.

It is a problem that the one or more conduits may change character over time, wherein an initial factory calibration may change as the conduits are corroded, eroded, or otherwise changed. As a consequence, the conduit stiffness may change from an initial representative stiffness value (or original measured stiffness value) over the life of the vibratory flowmeter.

Mass flow rate ($\dot{m}$) generated by a flowmeter may be derived according to the equation:

$$\dot{m} = FCF^*[\Delta t - \Delta t_o] \quad (1)$$

The Flow Calibration Factor (FCF) is required to determine a mass flow rate measurement ($\dot{m}$) or a density measurement ($\rho$) of a fluid. The FCF term typically comprises a geometric constant (G), Young's Modulus (E), and a moment of inertia (I), wherein:

$$FCF = G^*E^*I \quad (2)$$

The geometric constant (G) for the vibratory flowmeter is fixed and does not change. The Young's Modulus constant (E) likewise does not change. By contrast, the moment of inertia (I) may change. One way to track the changes in moment of inertia and FCF of a vibratory flowmeter is by monitoring the stiffness of the flowmeter conduits.

There are increasing demands for ever better ways to track changes in the FCF, which affect the fundamental performance of a vibratory flowmeter. What is needed is an apparatus and technique for reducing the time and/or improving the accuracy in tracking the FCF in a Coriolis flowmeter so to verify flowmeter performance with improved precision.

SUMMARY OF THE INVENTION

A meter verification method for a vibratory flowmeter is provided according to an embodiment. The method comprises the steps of vibrating a sensor assembly of the vibratory flowmeter with a plurality of test tones in a vibration mode using a driver, wherein the plurality of test tones is applied substantially instantly, in the absence of a ramp function and determining the current of the driver for the vibration mode. Also, first and second response voltages of first and second pickoff sensors for the vibration mode are determined. The instantaneous frequency of the first and second pickoff sensor signals is measured. Filtering is applied to the pickoff sensor signals and current signals to isolate the response at each of the plurality of test tones. The filter is applied to the instantaneous frequency measurements. A same delay is applied to the frequency measurements and the response at each of the plurality of test tones. A meter stiffness value is generated using the current and the response voltages, and proper operation of the vibratory flowmeter is verified using the meter stiffness value.

A vibratory flowmeter for meter verification is provided according to an embodiment. The vibratory flowmeter comprises a sensor assembly including one or more flow tubes and first and second pickoff sensors, and a driver configured to vibrate the one or more flow tubes. Meter electronics is coupled to the first and second pickoff sensors and coupled to the driver, with the meter electronics being configured to vibrate the sensor assembly with a plurality of test tones in a vibration mode using the driver wherein the plurality of test tones is applied without a ramp function, determine a current of the driver for the vibration mode, determine response voltages of first and second pickoff sensors for the mode, measure an instantaneous frequency of the first and second pickoff sensor signals, apply a filter to the first and second pickoff sensor signals and current signals to isolate the response at each of the plurality of test tones, apply the filter to the instantaneous frequency measurements, apply a same delay to the frequency measurements and the response at each of the plurality of test tones, generate a meter stiffness value using the current and the response voltages, and verify proper operation of the vibratory flowmeter using the meter stiffness value.

Aspects

According to an aspect, a meter verification method for a vibratory flowmeter comprises: vibrating a sensor assembly of the vibratory flowmeter with a plurality of test tones in a vibration mode using a driver, wherein the plurality of test tones is applied substantially instantly, in the absence of a ramp function; determining a current of the driver for the vibration mode; determining response voltages of first and second pickoff sensors for the mode; measuring the instantaneous frequency of the first and second pickoff sensor signals; applying a filter to the first and second pickoff sensor signals and current signals to isolate the response at each of the plurality of test tones; applying the filter to the instantaneous frequency measurements; applying a same delay to the frequency measurements and the response at each of the plurality of test tones; generating a meter stiffness value using the current and the response voltages; and verifying proper operation of the vibratory flowmeter using the meter stiffness value.

Preferably, the filter comprises a plurality of filter coefficients.

Preferably, the method comprises the steps of: defining a plurality of filter constraints; calculating the filter's response; and iteratively increasing a number of filter coefficients until the filter's response meets and/or exceeds the defined filter properties.

Preferably, the plurality of filter constraints comprises at least one passband frequency and at least one stopband frequency.

Preferably, the plurality of filter constraints comprises at least one of a decibel attenuation per frequency band, passband ripple, stopband attenuation, Nyquist frequency, and filter amplitude.

Preferably, the step of recalculating a filter response after iteratively increasing the number of filter coefficients.

Preferably, the step of verifying proper operation of the vibratory flowmeter comprises: comparing the meter stiffness value to a predetermined stiffness range; generating a verification indication for the vibratory flowmeter if the meter stiffness value falls within the predetermined stiffness range; and generating a verification failure indication for the vibratory flowmeter if the meter stiffness value does not fall within the predetermined stiffness range.

According to an aspect, a vibratory flowmeter for meter verification is provided. The vibratory flowmeter comprises a sensor assembly including one or more flow tubes and first and second pickoff sensors; a driver configured to vibrate the one or more flow tubes; and meter electronics coupled to the first and second pickoff sensors and coupled to the driver, with the meter electronics being configured to vibrate the sensor assembly with a plurality of test tones in a vibration mode using the driver wherein the plurality of test tones is applied without a ramp function, determine a current of the driver for the vibration mode, determine response voltages of first and second pickoff sensors for the mode, measure an instantaneous frequency of the first and second pickoff sensor signals, apply a filter to the first and second pickoff sensor signals and current signals to isolate the response at each of the plurality of test tones, apply the filter to the instantaneous frequency measurements, apply a same delay to the frequency measurements and the response at each of the plurality of test tones, generate a meter stiffness value using the current and the response voltages, and verify proper operation of the vibratory flowmeter using the meter stiffness value.

Preferably, the filter comprises a plurality of filter coefficients.

Preferably, the meter electronics are configured to receive a plurality of filter property constraints, calculating the filter's response, and iteratively increase a number of filter coefficients until the filter's response meets and/or exceeds the defined filter constraints.

Preferably, the plurality of filter constraints comprises a passband frequency and a stopband frequency.

Preferably, the plurality of filter constraints comprises at least one of a decibel attenuation per frequency band, passband ripple, stopband attenuation, Nyquist frequency, and filter amplitude.

Preferably, the meter electronics is configured to recalculate a filter response after iteratively increasing the number of filter coefficients.

BRIEF DESCRIPTION OF THE DRAWINGS

The same reference number represents the same element on all drawings. The drawings are not necessarily to scale.

DETAILED DESCRIPTION OF THE INVENTION

FIGS. 1-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
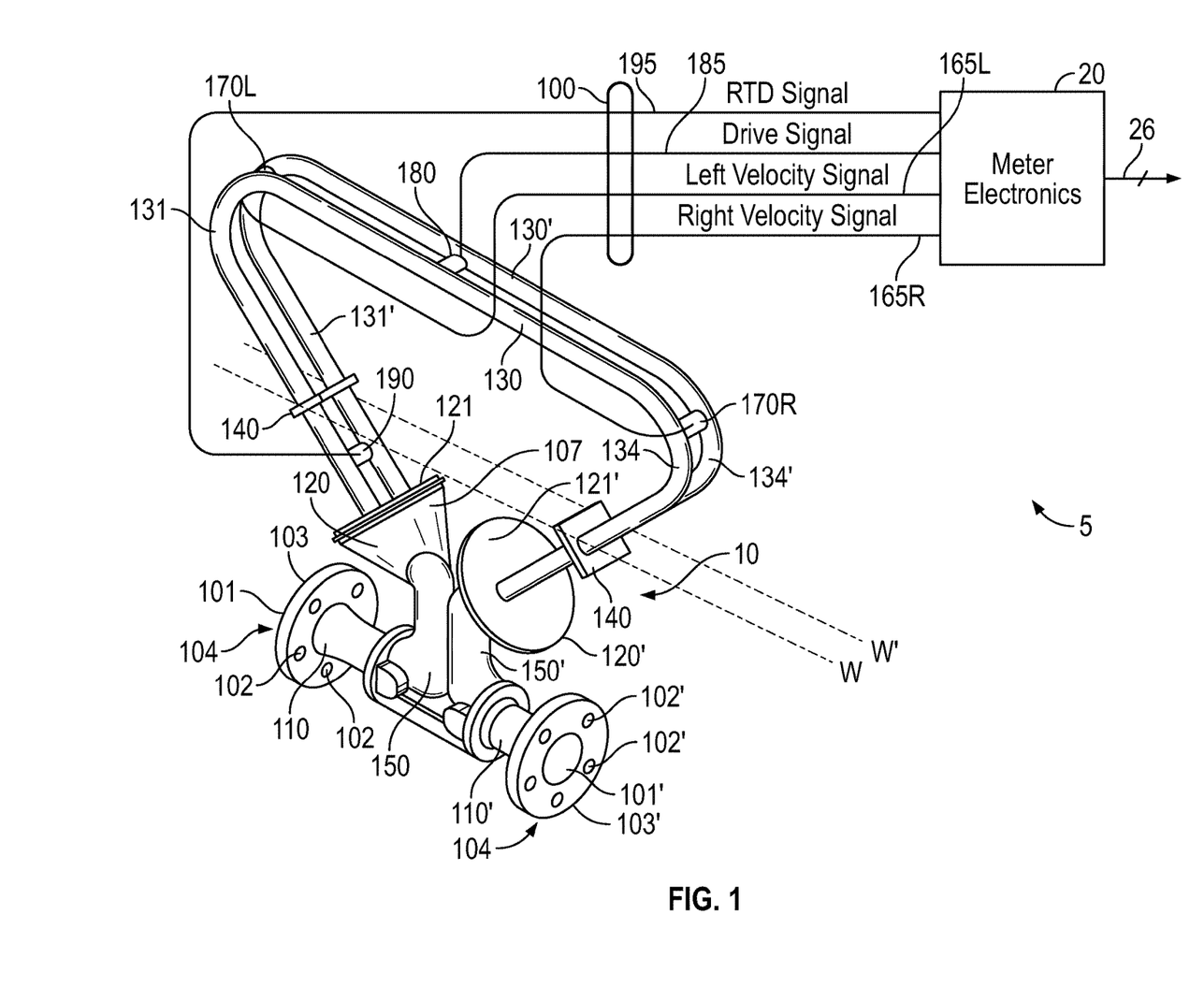
FIG. 1 illustrates a vibratory flowmeter according to an embodiment.

FIG. 1 shows a vibratory flowmeter 5 for improved meter verification according to an embodiment. The flowmeter 5 comprises a sensor assembly 10 and meter electronics 20 coupled to the sensor assembly 10. The sensor assembly 10 responds to at least a mass flow rate and/or a density of a process material. The meter electronics 20 is connected to the sensor assembly 10 via leads 100 to provide density, mass flow rate, and temperature information over a communication link 26, as well as other information. A Coriolis flowmeter structure is described although it is apparent to those skilled in the art that the present invention could also be operated as a vibrating tube densitometer.

The sensor assembly 10 includes manifolds 150 and 150', flanges 103 and 103' having flange necks 110 and 110', parallel flow tubes 130 and 130', driver 180, and first and second pickoff sensors 170L and 170R. The driver 180 is in communication with the one or more flow tubes 130 and 130'. In addition, in some embodiments the sensor assembly 10 may include a temperature sensor 190. The flow tubes 130 and 130' have two essentially straight inlet legs 131 and 131' and outlet legs 134 and 134' which converge towards each other at the flow tube mounting blocks 120 and 120'. The flow tubes 130 and 130' bend at two symmetrical locations along their length and are essentially parallel throughout their length. The brace bars 140 and 140' serve to define the axis W and the substantially parallel axis W' about which each flow tube oscillates.

The side legs 131, 131' and 134, 134' of the flow tubes 130 and 130' are fixedly attached to flow tube mounting blocks 120 and 120' and these blocks, in turn, are fixedly attached to the manifolds 150 and 150'. This provides a continuous closed material path through the sensor assembly 10.

When the flanges 103 and 103', having holes 102 and 102' are connected, via the inlet end 104 and the outlet end 104' into a process line (not shown) which carries the process material that may be measured, material enters the end 104 of the meter through an orifice 101 in the flange 103 and is conducted through the manifold 150 to the flow tube mounting block 120 having a surface 121. Within the manifold 150 the material is divided and routed through the flow tubes 130 and 130'. Upon exiting the flow tubes 130 and 130', the process material is recombined in a single stream within the manifold 150' and is thereafter routed to the outlet end 104' connected by the flange 103' having bolt holes 102' to the process line (not shown).

The flow tubes 130 and 130' are selected and appropriately mounted to the flow tube mounting blocks 120 and 120' so as to have substantially the same mass distribution, moments of inertia, and Young's modulus about the bending axes W-W and W'-W', respectively. These bending axes go through the brace bars 140 and 140'. Inasmuch as the Young's modulus of the flow tubes change with temperature, and this change affects the calculation of flow and density, the resistive temperature detector (RTD) 190 is mounted to the flow tube 130', to continuously measure the temperature of the flow tube. The temperature-dependent voltage appearing across the RTD 190 may be used by the meter electronics 20 to compensate for the change in the elastic modulus of the flow tubes 130 and 130' due to any changes in flow tube temperature. The RTD 190 is connected to the meter electronics 20 by the lead 195.

Figure 2:
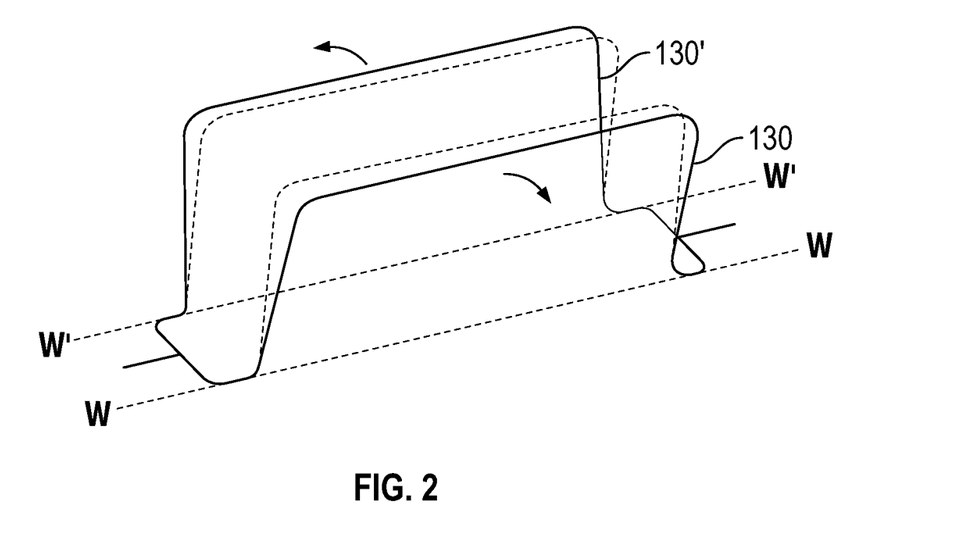
FIG. 2 represents a vibratory flowmeter having curved flow tubes wherein the two parallel curved flow tubes are vibrated in a bending mode.

FIG. 2 represents a vibratory flowmeter 5 having curved flow tubes 130 and 130' wherein the two parallel curved flow tubes 130 and 130' are vibrated in a bending mode. The dashed lines in the figure show the rest positions of the two flow tubes 130 and 130'. In the bending mode, the flow tubes 130 and 130' are vibrated with respect to the bending axes W-W and W'-W'. Consequently, the flow tubes 130 and 130' move periodically away from each other (as shown by the curved arrows), then toward each other. It can be seen that each flow tube 130 and 130' moves as a whole with respect to the bending axes W-W and W'-W'.

The meter electronics 20 receives the RTD temperature signal on the lead 195, and the left and right velocity signals appearing on the leads 165L and 165R, respectively. The meter electronics 20 produces the drive signal appearing on the lead 185 to the driver 180 and vibrates the flow tubes 130 and 130'. The meter electronics 20 processes the left and right velocity signals and the RTD signal to compute the mass flow rate and the density of the material passing through the sensor assembly 10. This information, along with other information, is applied by the meter electronics 20 over the communication link 26 to an external device or devices.

Flowmeters are inevitably affected by operation, by the operating environment, and by the flow material flowing through the flowmeter. As a result, the meter stiffness may change over time, such as due to erosion by the flow material, and corrosion, for example. Changes in the meter stiffness can result in erroneous flow rate measurements. Consequently, operating the vibratory flowmeter using a flow calibration factor value that was obtained at the time of manufacture may result in increasingly inaccurate measurements by the vibratory flowmeter over time.

Figure 3:
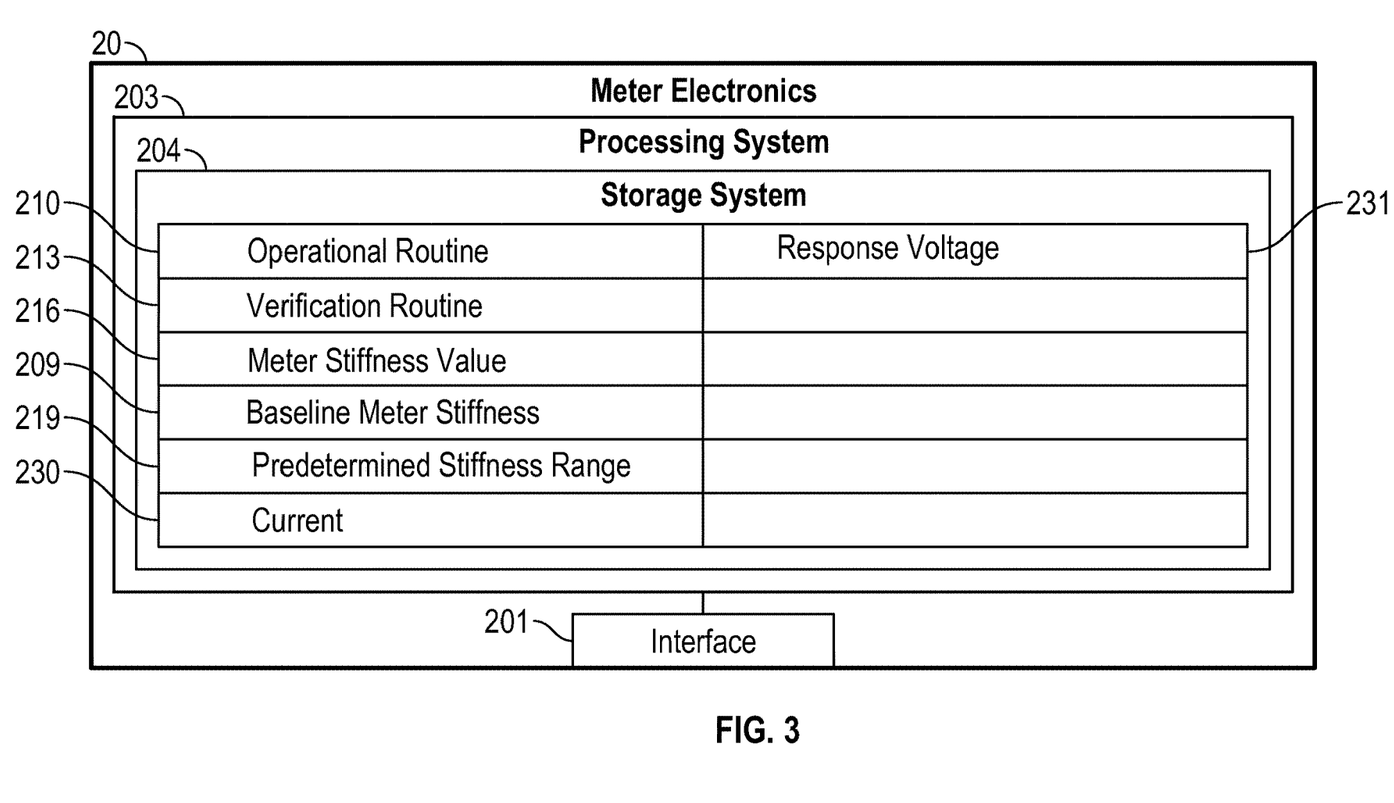
FIG. 3 illustrates meter electronics according to an embodiment.

FIG. 3 illustrates meter electronics 20 for meter verification of the vibratory flowmeter 5 according to an embodiment. The meter electronics 20 may include an interface 201 and a processing system 203. The meter electronics 20 receives and processes first and second sensor signals from the sensor assembly 10, such as pickoff sensor signals from the first and second pickoff sensors 170L, 170R.

The interface 201 transmits a drive signal to the driver 180 via lead 165. Alternatively, the interface 201 can transmit a drive signal and a meter verification excitation signal to the driver 180. As a result, the meter electronics 20 can inject additional signals (i.e., meter verification excitation signals) into the driver 180 for the meter verification process. Currents can then be measured for the driver 180 due to the meter verification excitation signals.

The interface 201 receives the first and second sensor signals from the first and second pickoff sensors 170L and 170R via the leads 100 as illustrated by FIG. 1. The interface 201 can perform any necessary or desired signal conditioning, such as any manner of formatting, amplification, buffering, etc. Alternatively, some or all of the signal conditioning can be performed in the processing system 203.

In addition, the interface 201 can enable communications between the meter electronics 20 and external devices, such as via the communication link 26, for example. The interface 201 can transfer measurement data to external devices via the communication link 26 and can receive commands, updates, data, and other information from external devices. The interface 201 can be capable of any manner of electronic, optical, or wireless communication.

The interface 201 in one embodiment comprises a digitizer, wherein the sensor signal comprises an analog sensor signal. The digitizer samples and digitizes the analog sensor signal and produces a digital sensor signal. The interface/digitizer can also perform any needed decimation, wherein the digital sensor signal is decimated in order to reduce the amount of signal processing needed and to reduce the processing time.

The processing system 203 conducts operations of the meter electronics 20 and processes flow measurements from the sensor assembly 10. The processing system 203 executes an operational routine 210 and thereby processes the flow measurements in order to produce one or more flow characteristics (or other flow measurements).

The processing system 203 can comprise a general purpose computer, a microprocessing system, a logic circuit, or some other general purpose or customized processing device. The processing system 203 can be distributed among multiple processing devices. The processing system 203 can include any manner of integral or independent electronic storage medium, such as the storage system 204. The storage system 204 may be coupled to the processing system 203 or may be integrated into the processing system 203.

The storage system 204 can store information used for operating the vibratory flowmeter 5, including information generated during the operation of the vibratory flowmeter 5. The storage system 204 can store one or more signals that are used for vibrating the flow tubes 130 and 130' and that are provided to the driver 180. In addition, the storage system 204 can store vibrational response signals generated by the first and second pickoff sensors 170L and 170R when the flow tubes 130 and 130' are vibrated.

The drive signal may comprise generating a vibration along with the meter verification excitation signals (tones), for example. The vibration in some embodiments may comprise a bending mode vibration. However, other or additional vibration modes are contemplated and are within the scope of the description and claims.

The storage system 204 can store a current 230. The drive current 230 may comprise a drive/excitation current or currents used to generate the vibration mode in the sensor assembly 10 as well as the meter verification signals.

The storage system 204 can store a response voltage 231. The response voltage 231 may comprise sinusoidal voltage signals or voltage levels generated in response to the vibration mode. The response voltage 231 may comprise voltage signals or voltage levels (such as peak voltages) generated by one or both of the first and second pickoff sensors 170L and 170R. The response voltages will also include the responses at the meter verification excitation signal frequencies.

The storage system 204 can store a meter stiffness value 216. The meter stiffness value 216 comprises a stiffness value that is determined from vibrational responses generated during operation of the vibratory flowmeter 5. The meter stiffness value 216 may be generated in order to verify proper operation of the vibratory flowmeter 5. The meter stiffness value 216 may be generated for a verification process, wherein the meter stiffness value 216 serves the purpose of verifying proper and accurate operation of the vibratory flowmeter 5.

The meter stiffness value 216 may be generated from the information or measurements generated during a primary vibration mode. The vibrational response of a flowmeter can be represented by an open loop, second order drive model, comprising:

$$M\ddot{x} + C\dot{x} + Kx = f(t) \tag{3}$$

where f is the force applied to the system, M is a mass parameter of the system, C is a damping parameter, and K is a stiffness parameter. The term x is the physical displacement distance of the vibration, the term $\dot{x}$ is the velocity of the flow tube displacement, and the term $\ddot{x}$ is the acceleration. This is commonly referred to as the MCK model. This formula can be rearranged into the form:

$$(ms^2 + cs + k)X(s) = F(s) + (ms+c)x(0) + m\dot{x}(0) \tag{4}$$

Equation (4) can be further manipulated into a transfer function form, while ignoring the initial conditions. The result is:

$$H(s) = \frac{\text{output}}{\text{input}} = \frac{X(s)}{F(s)} = \frac{\frac{1}{m}}{s^2 + \frac{c}{m}s + \frac{k}{m}} \tag{5}$$

Further manipulation can transform equation (5) into a first order pole-residue frequency response function form, comprising:

$$H(\omega) = \frac{R}{(j\omega - \lambda)} + \frac{\overline{R}}{(j\omega - \overline{\lambda})} \tag{6}$$

where λ is the pole, R is the residue, the term j comprises the square root of −1, and ω is the circular excitation frequency in radians per second.

The system parameters comprising the natural/resonant frequency ($\omega_n$), the damped natural frequency ($\omega_d$), and the decay characteristic (ζ) are defined by the pole (λ).

$$\omega_n = |\lambda| \tag{7}$$

$$\omega_d = \text{imag}(\lambda) \tag{8}$$

$$\zeta = \frac{\text{real}(\lambda)}{\omega_n} \tag{9}$$

The stiffness parameter (K), the damping parameter (C), and the mass parameter (M) of the system can be derived from the pole (λ) and residue (R).

$$M = \frac{1}{2jR\omega_d} \tag{10}$$

$$K = \omega_n^2 M \tag{11}$$

$$C = 2\zeta\omega_n M \tag{12}$$

Consequently, the stiffness parameter (K), the mass parameter (M), and the damping parameter (C) can be calculated based on a good estimate of the pole (λ) and the residue (R).

The pole (λ) and residue (R) are estimated from the measured Frequency Response Functions (FRFs). The pole (λ) and the residue (R) can be estimated using an iterative computational method, for example.

The response near the drive frequency is composed of primarily the first term of equation (6), with the complex conjugate term contributing only a small, nearly constant "residual" part of the response. As a result, equation (6) can be simplified to:

$$H(\omega) = \frac{R}{(j\omega - \lambda)} \tag{13}$$

In equation (13), the H(ω) term is the measured FRF. In this derivation, H is composed of a displacement output divided by a force input. However, with the voice coil pickoffs typical of a Coriolis flowmeter, the measured FRF (i.e., an $\breve{H}$ term) is in terms of velocity divided by force. Therefore, equation (13) can be transformed into the form:

$$\breve{H}(\omega) = H(\omega) \cdot j\omega = \frac{j\omega R}{(j\omega - \lambda)} \tag{14}$$

Equation (14) can be further rearranged into a form that is easily solvable for the pole (λ) and the residue (R).

$$\breve{H} j\omega - \breve{H}\lambda = j\omega R \tag{15}$$

$$\breve{H} = R + \frac{\breve{H}}{j\omega}\lambda \tag{16}$$

$$\begin{bmatrix} 1 & \frac{\breve{H}}{j\omega} \end{bmatrix} \begin{Bmatrix} R \\ \lambda \end{Bmatrix} = \breve{H} \tag{17}$$

When measured at a sufficient number of tones (ω) equations (15)-(17) form an over-determined system of equations. Equation (17) can be computationally solved in order to determine the pole (λ) and the residue (R) from the velocity/force FRF (H). The terms H, R, and λ are complex.

Recognizing that the FRFs share a common pole (λ) but separate residues ($R_L$) and ($R_R$), the two measurements can be combined advantageously to result in a more robust pole and residue determination.

$$\begin{bmatrix} 1 & 0 & \dfrac{\breve{H}_{LPO}}{j\omega} \\ 0 & 1 & \dfrac{\breve{H}_{RPO}}{j\omega} \end{bmatrix} \begin{Bmatrix} R_L \\ R_R \\ \lambda \end{Bmatrix} = \breve{H} \qquad (18)$$

Equation (18) can be solved in any number of ways. In one embodiment, the equation is solved through a recursive least squares approach. In another embodiment, the equation is solved through a pseudo-inverse technique. In yet another embodiment, because all of the measurements are available simultaneously, a standard Q-R decomposition technique can be used. The Q-R decomposition technique is discussed in Modern Control Theory, William Brogan, copyright 1991, Prentice Hall, pp. 222-224, 168-172.

After equation (18) is solved, then the pole (λ) and residue (R) can be used for generating stiffness values according to equations (10) and (11). Equations (10) and (11) can be used to generate stiffness values between the driver 180 and the left and right pickoffs. The stiffness values are of the size [2×1]. The stiffness vector X can be stored as the meter stiffness value 216.

The storage system 204 can store a baseline meter stiffness 209 that is programmed into the meter electronics 20. In some embodiments, the baseline meter stiffness 209 may be programmed into the meter electronics 20 at the factory, such as upon construction or sale of the vibratory flowmeter 5. Alternatively, the baseline meter stiffness 209 may be programmed into the meter electronics 20 during a field calibration operation or other calibration or re-calibration operation. However, it should be understood that the baseline meter stiffness 209 in most embodiments will not generally be changeable by a user or operator or during field operation of the vibratory flowmeter 5.

If the meter stiffness value 216 is substantially the same as the baseline meter stiffness 209, then it can be determined that the vibratory flowmeter 5 is relatively unchanged in condition from when it was manufactured, calibrated, or when the vibratory flowmeter 5 was last re-calibrated. Alternatively, where the meter stiffness value 216 significantly differs from the baseline meter stiffness 209, then it can be determined that the vibratory flowmeter 5 has been degraded and may not be operating accurately and reliably, such as where the vibratory flowmeter 5 has changed due to metal fatigue, corrosion, erosion due to flow, or other operating condition or effect.

The storage system 204 can store a predetermined stiffness range 219. The predetermined stiffness range 219 comprises a selected range of acceptable stiffness values. The predetermined stiffness range 219 may be chosen to account for normal wear on the vibratory flowmeter 5. The predetermined stiffness range 219 may be chosen to account for corrosion or erosion in the vibratory flowmeter 5.

In some embodiments, the storage system 204 stores a verification routine 213. The verification routine 213, when executed by the processing system 203, can perform a verification process for the vibratory flowmeter 5. In some embodiments, the processing system 203 when executing the verification routine 213 is configured to generate a meter stiffness value. In some embodiments, the processing system 203 when executing the verification routine 213 is configured to generate a meter stiffness value and verify the proper operation of the vibratory flowmeter using the meter stiffness value. The verification operation is significant because it enables the meter electronics 20 to make a stiffness determination in the field, without performing an actual flow calibration test. It enables a stiffness determination without a calibration test stand or other special equipment or special fluids. This is desirable because performing a flow calibration in the field is expensive, difficult, and time-consuming.

Figure 4A:
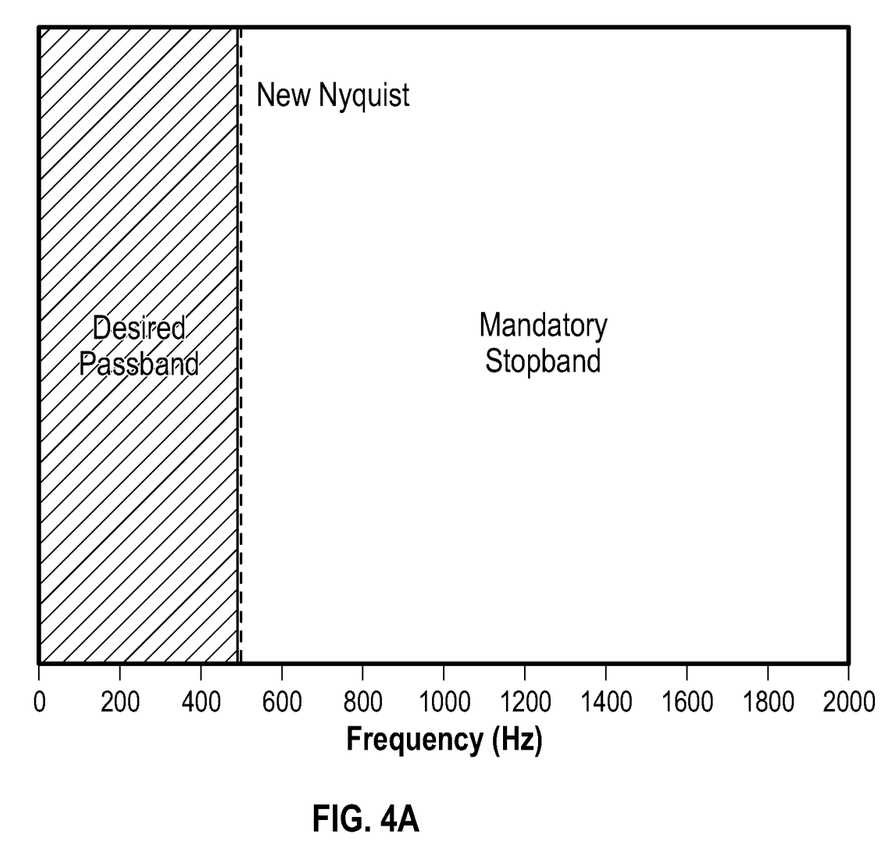
FIG. 4A is a graph indicating an example desired filter response.
Figure 4B:
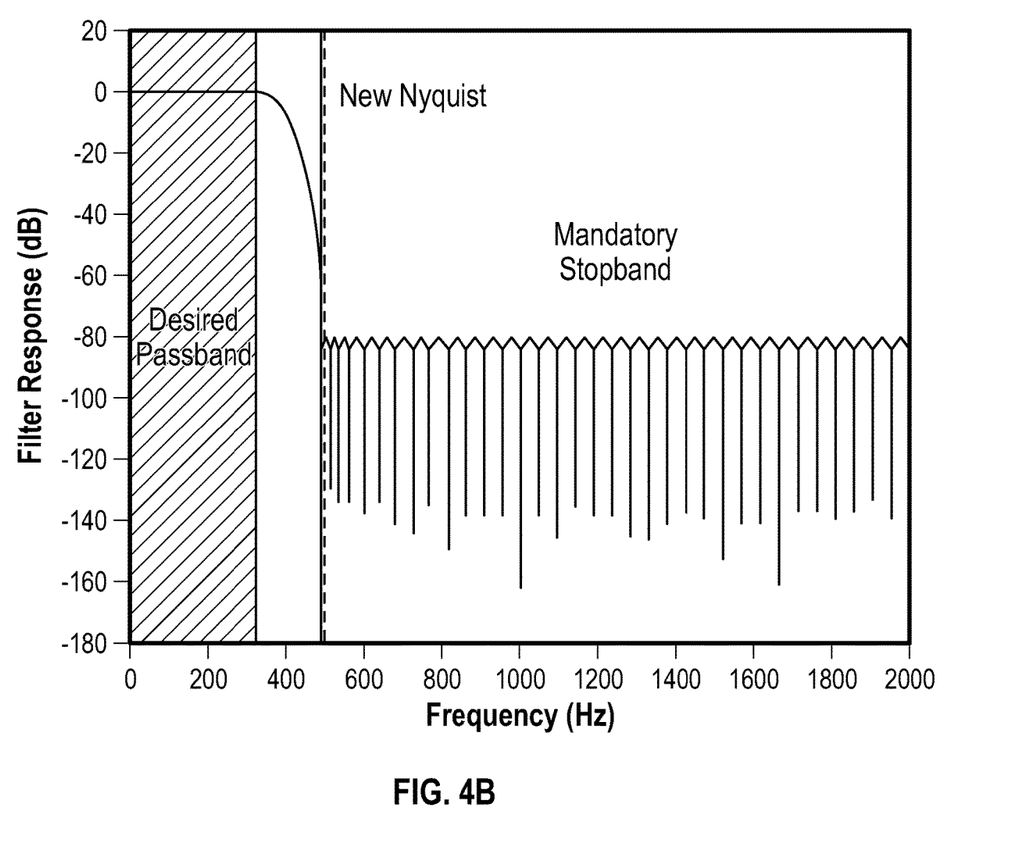
FIG. 4B is a graph indicating an example filter response.

In embodiments of the invention, filtering may be necessary to avoid aliasing in both decimation and up-sampling. Since filters have an associated settling time and delay, depending on the filter order, large delays are problematic from a control standpoint. Designing decimation filters is a tradeoff; filter order and desired attenuation must be managed so to provide an optimal balance between filter speed and filter effectiveness. FIG. 4A illustrates the case of an example desired filter—decimating from a 4 kHz to a 1 kHz sample rate. A decimation filter, according to an embodiment, is designed to accomplish the desired filtering of FIG. 4A as illustrated in FIG. 4B. The Nyquist frequency is about 500 Hz. To avoid aliasing, however, all content above 500 Hz must be filtered out, so to accomplish this, attenuation must begin at a far lower frequency, thus a clean passband exists only up to about 340 Hz. Clearly, optimal filter design is a tradeoff between desired filter response and filter order.

By selectively filtering bands which are relevant to the final desired goal, it is possible to increase filter performance and/or reduce response time. For example, assume that a given decimation filter has historically used 80 filter coefficients. In an embodiment of the present invention, a filter designed with the approach outlined herein may achieve the same desired attenuation with only 25 filter coefficients, for example without limitation, which equates to a faster response time. Alternatively, this approach may provide significantly increased attenuation with the same response time by using 80 coefficients, for example. Of course, improvements in both attenuation and response time can be had by using some number of coefficients between 25 and 80, for example. It must be stressed that the number of coefficients indicated is done merely for providing an example, and greater than 80 or less than 25 coefficients, and any number in between, are contemplated.

The filter is designed using desired frequencies and weights as constraints, and if, on a particular design iteration, the filter meets or exceeds the design constraints, filter coefficients are returned. If, however, the design does not meet the desired criteria, the filter order is iteratively increased until the design constraints are met. In an embodiment, the filter is iteratively plotted against the design criteria, so that a user may visualize the benefit of additional filter coefficients.

Figure 5:
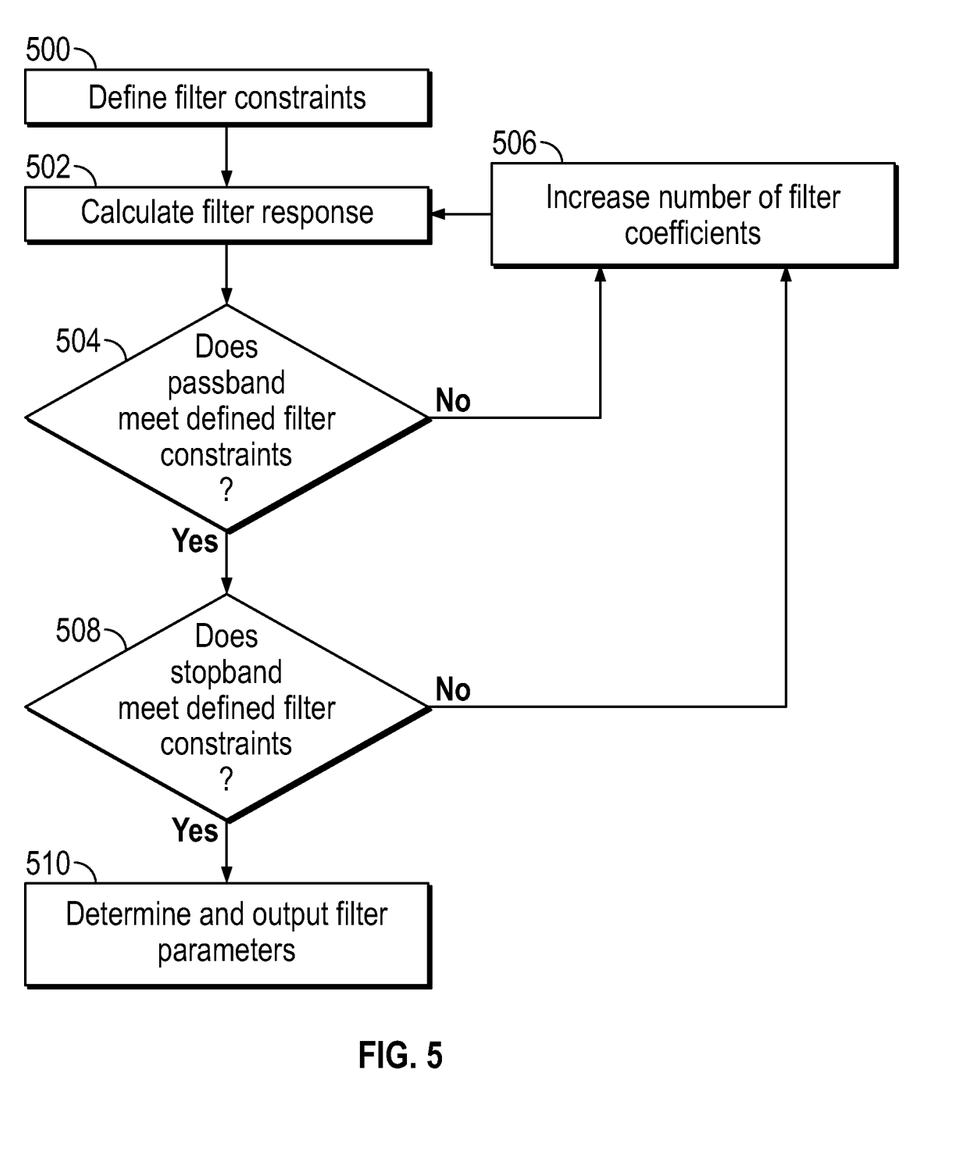
FIG. 5 is a flowchart of a filter design method according to an embodiment.

Turning to FIG. 5, a flow chart illustrates an embodiment for designing a filter having a minimum number of required filter coefficients. The process begins with defining the filter's properties, as is shown in step 500. For example, without limitation, the properties may include the specified decibel attenuation per frequency band, particular frequency bands, passband ripple, stopband attenuation, Nyquist frequency, filter amplitude, etc. Initially, the filter's response is calculated, so to establish a baseline for comparison with the desired filter properties defined in step 502. In step 504, it is determined whether the passband frequency meets or exceeds the desired filter properties defined in step 502. This comparison may be accomplished empirically or through the use of a simulation. If not, in step 506 the number of filter coefficients is incremented. Otherwise, the next step is to determine whether the stopband frequency meets or exceeds the desired filter properties defined in step 502. If not, in step 506 the number of filter coefficients is incremented. If, however, the stopband frequency meets or exceeds the desired filter properties, the desired filter parameters are determined, as shown in step 510. For example, without limitation, the desired filter parameters may be at least one of the filter amplitude values, the filter attenuation, and the filter's frequency bands. In a related embodiment, each time the number of filter coefficients is increased, the filter response is iteratively visually plotted so to visually indicate to a user the effect that each additional filter coefficient confers on filter performance.

In an embodiment, starting with the desired frequency bands and the desired passband ripple or stopband attenuation, it is possible to iteratively increase filter order until desired response characteristics are attained. Taking the desired ripple and stopband (in dB) as inputs and transforming them into the appropriate weightings, a filter may be designed utilizing the following expressions:

$$passweight = \frac{1}{1 - 10^{\frac{-dB\ ripple}{20}}} \quad (19)$$

$$stopweight = 10^{\frac{dB\ Atten.}{20}} \quad (20)$$

These equations serve as illustrative non-limiting examples only, and other equations or algorithms are contemplated.

Figure 6:
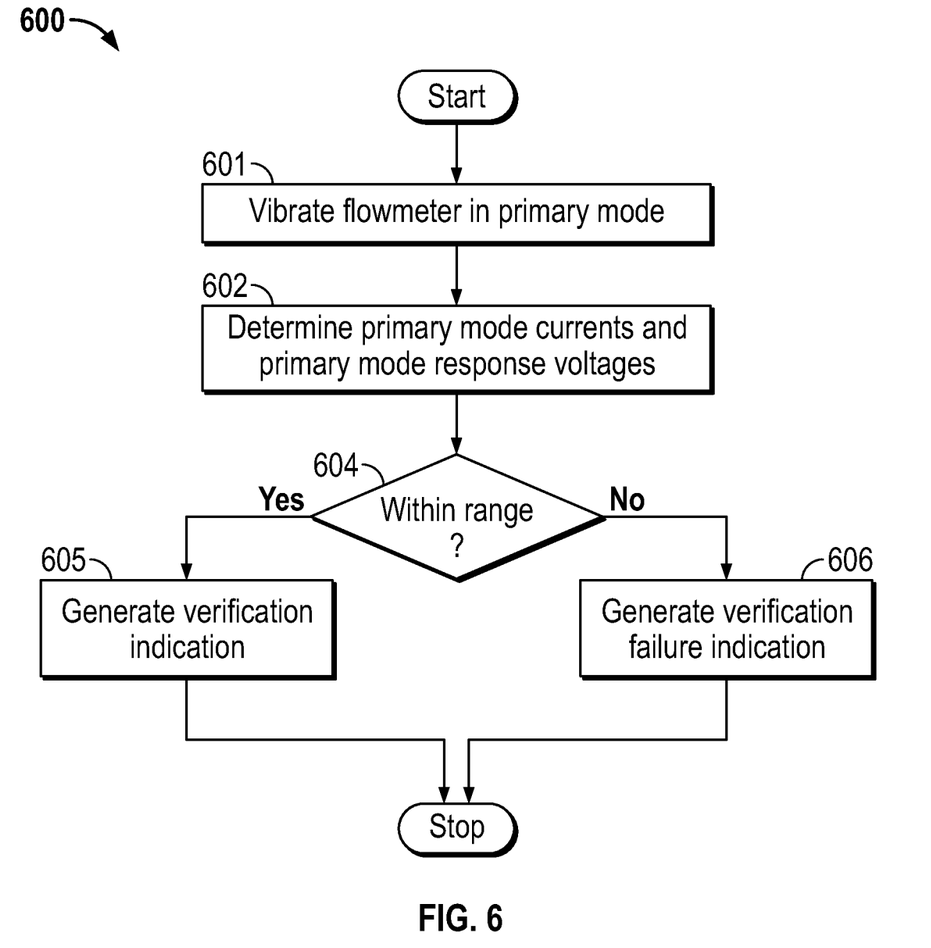
FIG. 6 is a flowchart of a meter verification method for a vibratory flowmeter according to an embodiment.

FIG. 6 is a flowchart 600 illustrating a meter verification method for a vibratory flowmeter, according to an embodiment. In step 601, the sensor assembly 10 of the vibratory flowmeter 5 generates test tones, and is thus vibrated in a vibration mode to generate a vibrational response. A plurality of test tones may be generated. It should be stressed that the test tones are applied to the meter immediately at a desired amplitude, without ramping up the amplitude over a period of time. The vibrational response comprises electrical signals generated by the first and second pickoff sensors 170L and 170R. The vibration mode may comprise a bending mode. However, it should be understood that the vibration could comprise other vibration modes. It should also be understood that vibrating the sensor assembly 10 at the vibration mode comprises vibrating the sensor assembly 10 in a predetermined vibration mode and substantially at a resonance frequency for the predetermined vibration mode. Additionally, the pickoff sensors 170L and 170R may, in an embodiment, have filters applied to the signals generated. Any frequency estimate calculations performed by meter electronics 20 may, in an embodiment, pass the signals required for frequency estimates through the same filter chain as utilized for the pickoff sensors 170L, 170R.

In step 602, the current and the response voltages are determined. The current is the electrical currents flowing through the two drivers. The current can comprise commanded values of the current or can comprise a measured current value.

The response voltages 230, 231 are the voltages generated by the first and second pickoff sensors 170L, 170R. The response voltages 230, 231 can comprise voltages generated with operating at or near a resonant frequency of the vibration mode.

A meter stiffness value 216 is generated. The meter stiffness value 216 may be generated using the current and the response voltages 230, 231, as previously discussed. In step 604, the newly-generated meter stiffness value is compared with the baseline meter stiffness. If the meter stiffness value is within the predetermined stiffness range, then the method branches to step 605. If the meter stiffness value is not within the predetermined stiffness range, then the method branches to step 606.

The comparison may comprise determining a difference between the meter stiffness value and the baseline meter stiffness, wherein the difference is compared to a predetermined stiffness range. The predetermined stiffness range may comprise a stiffness range that includes expected variations in measurement accuracy, for example. The predetermined stiffness range may delineate an amount of change in the meter stiffness that is expected and is not significant enough to generate a verification failure determination. The predetermined stiffness range may be determined in any manner. In one embodiment, the predetermined stiffness range may comprise a predetermined tolerance range above and below the baseline meter stiffness. Alternatively, the predetermined stiffness range may be derived from a standard deviation or confidence level determination that generates upper and lower range boundaries from the baseline meter stiffness, or using other suitable processing techniques.

In step 605, a verification indication is generated since the difference between the meter stiffness value and the baseline meter stiffness fell within the predetermined stiffness range. The meter stiffness is therefore determined to not have changed significantly. No further action may need to be taken, although the result may be logged, reported, etc. The indication may include an indication to the user that the baseline meter stiffness is still valid. The successful verification indication signifies that the baseline meter stiffness is still accurate and useful and that the vibratory flowmeter is still operating accurately and reliably.

In step 606, a verification failure indication is generated since the difference between the meter stiffness value and the baseline meter stiffness has exceeded the predetermined stiffness range. The stiffness of the meter is therefore determined to have changed significantly. As part of the verification failure indication, a software flag, visual indicator, message, alarm, or other indication may be generated in order to alert the user that the flowmeter may not be acceptably accurate and reliable. In addition, the result may be logged, reported, etc.

Prior art meter verification requires at least 15 seconds for test tones to linearly ramp. This is due to the fact that immediately applying a test tone results in large frequency deviations, which adversely affect meter performance. Frequency estimates from Hilbert filters, for example, in the absence of a test tone ramp, modulate the test tone sum-and-difference frequencies, resulting in unacceptably large frequency deviations. In an embodiment, the need for the timed ramp is eliminated, as are frequency deviations in the absence of a ramped tone, thus reducing meter verification cycle time. In an embodiment, the same filters applied to the pickoffs 170L, 170R are applied to raw frequency estimates. This ensures that the frequency estimates and the frequency response function estimates are synchronous. The filters may be filters described herein and/or other filters not specifically noted. Since there is a delay associated with filtering, filtering pickoff signals for frequency response function estimation typically delays the frequency response function estimate. However, there is no delay while downsampling the frequency estimate, which can result in the frequency and pickoff signals not being time synchronized. Additionally, filters applied to the frequency estimate, according to the embodiments described herein, can suppresses the frequency variation that is imposed by instantaneously applying test tones, thus ensuring proper operation of flowmeter verification algorithms.

The vibratory flowmeter and method according to any of the embodiments can be employed to provide several advantages, if desired. The vibratory flowmeter and method according to any of the embodiments quantifies the flowmeter stiffness using one or more vibration modes to generate an improved and more reliable meter stiffness value, and does so quickly due to the elimination of ramped tones. The meter verification stiffness analysis may therefore quickly determine if the vibratory flowmeter is providing accurate and reliable data.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

What is claimed is:

1. A meter verification method for a vibratory flowmeter, with the method comprising:
   vibrating a sensor assembly of the vibratory flowmeter with a plurality of test tones in a vibration mode using a driver, wherein the plurality of test tones is applied substantially instantly, in the absence of a ramp function;
   determining a current of the driver for the vibration mode;
   determining response voltages of first and second pickoff sensors for the mode;
   measuring the instantaneous frequency of the first and second pickoff sensor signals;
   applying a filter to the first and second pickoff sensor signals and current signals to isolate the response at each of the plurality of test tones;
   applying the filter to the instantaneous frequency measurements;
   applying a same delay to the frequency measurements and the response at each of the plurality of test tones;
   generating a meter stiffness value using the current and the response voltages; and
   verifying proper operation of the vibratory flowmeter using the meter stiffness value.

2. The method of claim 1, wherein the filter comprises a plurality of filter coefficients.

3. The method of claim 2, comprising the steps of:
   defining a plurality of filter constraints;
   calculating the filter's response; and
   iteratively increasing a number of filter coefficients until the filter's response meets and/or exceeds the defined filter properties.

4. The method of claim 3, wherein the plurality of filter constraints comprises at least one passband frequency and at least one stopband frequency.

5. The method of claim 3, wherein the plurality of filter constraints comprises at least one of a decibel attenuation per frequency band, passband ripple, stopband attenuation, Nyquist frequency, and filter amplitude.

6. The method of claim 3, comprising the step of recalculating a filter response after iteratively increasing the number of filter coefficients.

7. The method of claim 1, wherein the step of verifying proper operation of the vibratory flowmeter comprises:
   comparing the meter stiffness value to a predetermined stiffness range;
   generating a verification indication for the vibratory flowmeter if the meter stiffness value falls within the predetermined stiffness range; and
   generating a verification failure indication for the vibratory flowmeter if the meter stiffness value does not fall within the predetermined stiffness range.

8. A vibratory flowmeter (5) for meter verification, the vibratory flowmeter (5) comprising:
   a sensor assembly (10) including one or more flow tubes (130, 130') and first and second pickoff sensors (170L, 170R);
   a driver (180) configured to vibrate the one or more flow tubes (130, 130'); and
   meter electronics (20) coupled to the first and second pickoff sensors (170L, 170R) and coupled to the driver (180), with the meter electronics (20) being configured to: vibrate the sensor assembly (10) with a plurality of test tones in a vibration mode using the driver (180) wherein the plurality of test tones is applied without a ramp function; determine a current of the driver for the vibration mode; determine response voltages of first and second pickoff sensors for the mode; measure an instantaneous frequency of the first and second pickoff sensor signals; apply a filter to the first and second pickoff sensor signals and current signals to isolate the response at each of the plurality of test tones; apply the filter to the instantaneous frequency measurements; apply a same delay to the frequency measurements and the response at each of the plurality of test tones; generate a meter stiffness value (216) using the current (230) and the response voltages (231); and verify proper operation of the vibratory flowmeter (5) using the meter stiffness value (216).

9. The vibratory flowmeter (5) of claim 8, wherein the filter comprises a plurality of filter coefficients.

10. The vibratory flowmeter (5) of claim 8, with the meter electronics (20) being configured to receive a plurality of filter property constraints, calculating the filter's response, and iteratively increase a number of filter coefficients until the filter's response meets and/or exceeds the defined filter constraints.

11. The vibratory flowmeter (5) of claim 10, wherein the plurality of filter constraints comprises a passband frequency and a stopband frequency.

12. The vibratory flowmeter (5) of claim 10, wherein the plurality of filter constraints comprises at least one of a decibel attenuation per frequency band, passband ripple, stopband attenuation, Nyquist frequency, and filter amplitude.

13. The vibratory flowmeter (5) of claim 8, with the meter electronics (20) being configured to recalculate a filter response after iteratively increasing the number of filter coefficients.

* * * * *

UNITED STATES PATENT AND TRADEMARK OFFICE
CERTIFICATE OF CORRECTION

PATENT NO. : 10,605,647 B2
APPLICATION NO. : 15/746669
DATED : March 31, 2020
INVENTOR(S) : Matthew Joseph Rensing, Christopher George Larsen and Timothy J. Cunningham It is certified that error appears in the above-identified patent and that said Letters Patent is hereby corrected as shown below:

In the Specification

Column 1, Line 60, replace "($\rho$ of a fluid" with --($\rho$) of a fluid--

Column 7, Line 30, the formula "$M\ddot{x}+C\ddot{x}+Kx=f(t)$" should read --$M\ddot{x}+C\dot{x}+Kx=f(t)$--

Column 9, Line 2, replace "velocity/force RFR (H)" with --velocity/force RFR --

Signed and Sealed this
Twentieth Day of October, 2020

Andrei Iancu
*Director of the United States Patent and Trademark Office*